United States Patent

[11] 3,615,176

[72] Inventors: William Riley Jenks;
Olyn Wayne Shannon, both of Memphis, Tenn.
[21] Appl. No. 824,354
[22] Filed Apr. 28, 1969
[45] Patented Oct. 26, 1971
[73] Assignee E. I. du Pont de Nemours and Company Wilmington, Del.
Continuation-in-part of application Ser. No. 734,767, June 5, 1968, now abandoned.

[54] SODIUM CYANIDE PROCESS AND BRIQUETS FORMED THEREFROM
13 Claims, 8 Drawing Figs.

[52] U.S. Cl. .................................................. 23/84, 264/109
[51] Int. Cl. .................................................. C01c 3/10, B29j 1/00
[50] Field of Search .......................................... 23/84; 264/37, 109, 115, 118, 121

[56] References Cited
UNITED STATES PATENTS
1,923,570 8/1933 Gabel .......................... 23/84
FOREIGN PATENTS
842,077 7/1960 Great Britain ............... 23/84

Primary Examiner—Oscar R. Vertiz
Assistant Examiner—Hoke S. Miller
Attorney—Robert W. Black ABSTRACT: Predensifying anhydrous sodium cyanide crystals and then compacting the resulting classified granules produces anhydrous sodium cyanide in briquet form that possesses unique characteristics. The briquets are essentially nonporous in structure with unit density approaching true crystal density and possess uniform internal hardness, remarkable durability and a high rate of solution. Using closed circuit hot air for conveying and drying, reduces sodium carbonate and formate content and the sodium cyanide is high in chemical purity.

INVENTORS
WILLIAM RILEY JENKS
OLYN WAYNE SHANNON

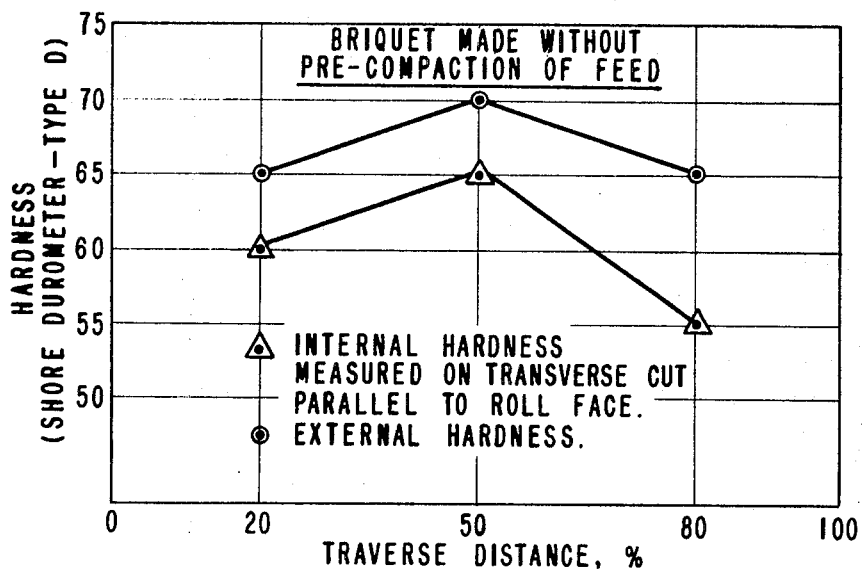
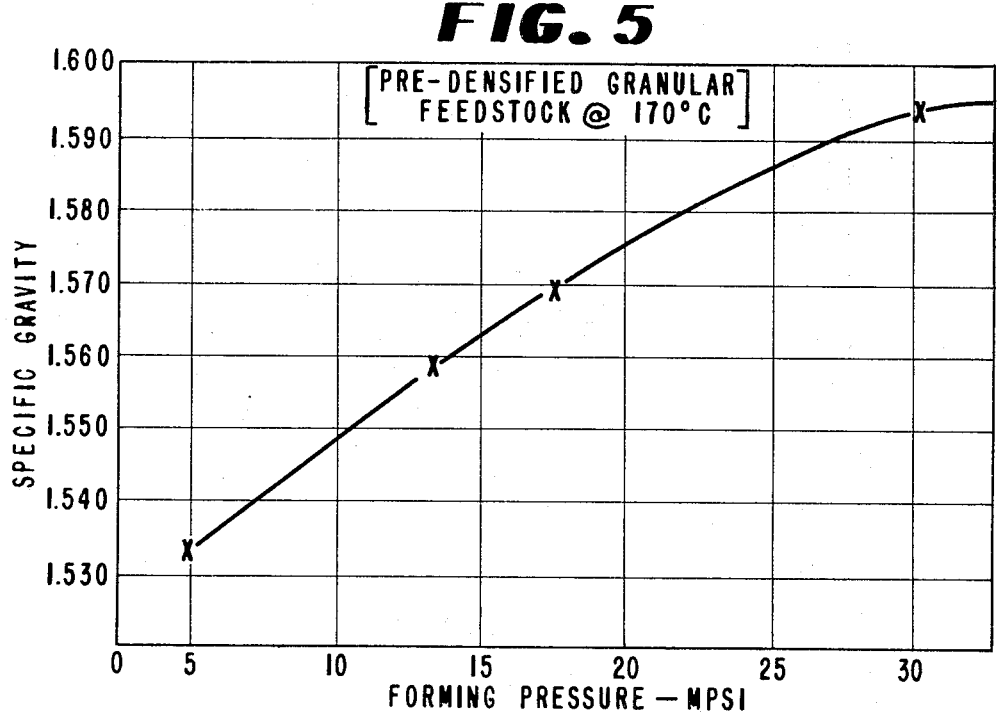

SODIUM CYANIDE PROCESS AND BRIQUETS FORMED THEREFROM

CROSS-REFERENCE TO RELATED APPLICATIONS

This application is a continuation-in-part of copending application Ser. No. 734,767, filed June 5, 1968, now abandoned.

BACKGROUND OF INVENTION

1. Field of Invention

This invention relates to a sodium cyanide compacting process and anhydrous briquettes formed from the compacted sodium cyanide.

2. Prior Art

The production of sodium cyanide by the evaporation of aqueous solutions of the same is well known. However, the dried product thus obtained is a fine, crystalline material which is difficult to handle due to the irritant and toxic nature of the dust associated with such handling. Various agglomeration techniques are employed in the industry to offset this defect, such as tabletting, pelletizing or briquetting the crystalline material. These compacted forms as hitherto produced are, however, subject to degradation and breakage for one reason or another in the course of commercial handling and, thus, regenerate the dusting problem. The reasons vary but are generally associated with nonuniform internal softness, low density and weak bonds between the individual particles.

SUMMARY OF INVENTION

According to the present invention there is provided the process comprising: compacting sodium cyanide crystals having a moisture content of no more than 0.05 percent by weight under heat and pressure into a translucent, noncrystalline sheet or ribbon of sodium cyanide; breaking the sodium cyanide sheet or ribbon into granules having a maximum size of USS No. 4 (U.S. Sieve Series—A.S.T.M. E-11-61) with no more than 10–25 percent of the granules finer than USS No. 50; classifying the granules as required so that the granular product has no more than 20 percent of USS No. 50 fines and recycling the remaining fines from the classifier to the compactor.

There is also provided a sodium cyanide briquette comprising an internal portion of granules having a planar surface between granules exhibiting a bond essentially as strong as the cleavage strength of a sodium cyanide crystal and an essentially uniform-type D Shore hardness of at least 65 throughout and an external compacted portion of higher hardness, said briquette having a relative density of at least about 0.97 and a solution rate equivalent of about 8–11 minutes standard solution time.

BRIEF DESCRIPTION OF DRAWINGS

FIG. 4a and 4b are graphs showing briquette uniformity as a function of granular feed character;

FIG. 5 is a graph showing the specific gravity of briquettes as a function of forming pressures at a granular feed temperature of 170° C.;

DETAILED DESCRIPTION OF INVENTION

Figure 1:
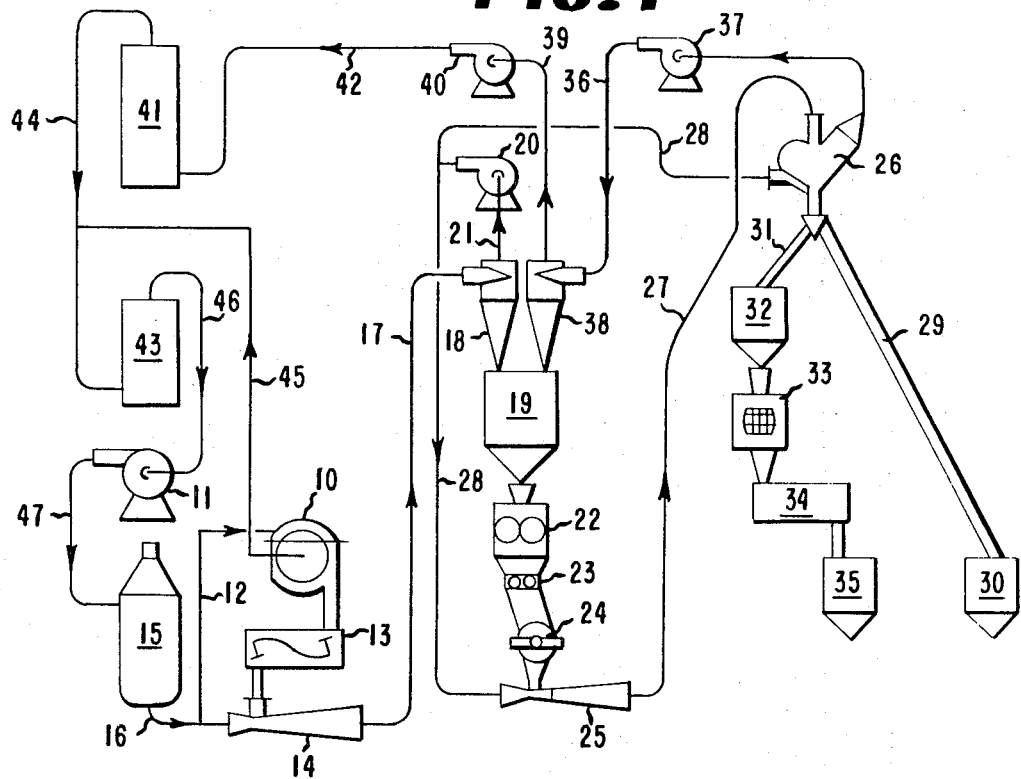
FIG. 1 is a schematic flow diagram of the process of the present invention.

With reference to FIG. 1, crystalline sodium cyanide, produced by evaporative concentration of an aqueous solution prepared by chemical reaction between hydrogen cyanide and aqueous caustic soda, is separated from the mother liquor by filtration on rotary drum dryer-filter 10. Hot air is supplied to the filter hood by the demister blower 11 through the air heater 15 and line 12 in the temperature range of 250° to 450° C., preferably 375° to 400° C. The hot air accomplishes some predrying of the filter cake and minimizes drying requirements further along in the process. The predrying reduces moisture content sufficiently (below 5 percent by weight) so that continuous feed without sticking and caking can be maintained to the air dryer venturi 14.

Partially dried sodium cyanide passes through mixing conveyor 13 which subdivides the partially dried cake so that no fragments in excess of 2 inches maximum dimension remain, and a uniform feed can be maintained to the dryer venturi 14. Essentially carbon dioxide free hot air is heated in heater 15 and is introduced into dryer feed venturi 14 through line 16 at a temperature within the range of 275° to 400° C., preferably 350° to 375° C. The moist sodium cyanide crystals containing 2–5 percent water, but generally about 3 percent water, are pneumatically conveyed and dried adiabatically in line 17 to an essentially bone-dry state, i.e., a moisture content of less than about 0.05 percent, preferably 0.03 percent by weight. The temperature and proportion of hot air to solids fed to venturi 14 is adjusted so that the dried product discharged from dryer-conveyor 17 is at a temperature within the range of 175° to 250° C., preferably 180° to 225° C. The dried product is discharged into cyclone 18 to deposit the solids in compactor feed bin 19 while the drying air is passed to blower 20 through line 21.

The dried sodium cyanide fines are compacted under heat and pressure in roll press 22 into a translucent, noncrystalline sheet or ribbon having a density within the range of 1.550 to 1.590 and a preferred thickness of about ⅛ to 3/16 inch. Compaction of the fines can be carried out over a wide temperature and pressure range. For example, the temperature can be within the range of 125° to 225° C. and the compression pressure can be within the range of 5,000 to 15,000 p.s.i. although the preferred conditions are a temperature of 180° to 225° C. and a pressure of 6,000 to 10,000 p.s.i. Under these conditions, the fines are converted to a continuous semiplastic (bends) sheet or ribbon of uniform texture, with no evidence of crystallinity and possessing the translucency of milky quartz and a density of 1.550 to 1,590. Ribbon thickness much above three-sixteenths inch, say one-fourth inch or thicker, is generally characterized by nonuniformity of compaction, perhaps due to difficulty in maintaining continuous uniform feed. This difficulty is compounded by the natural bridging action of the solids as they are packed more closely and compressive forces tend to be dispersed and distorted. This, coupled with the fact that a thicker ribbon has to be "cut" more times to be reduced to a USS No. 4 dimension, leads to excessive generation of fines in the grinding step.

The semiplastic compacted sheet or ribbon is then fed to a prebreaker 23 where it is partially broken into irregular chips of 1 to 2 inches in size and then to granulator 24, which is a modified hammer mill type especially adapted for controlled size reduction. By having the sodium cyanide crystals compacted into sheet form, with properties as described above, size reduction is accomplished in prebreaker 23 and granulator 24 without producing gross quantities of undesired fines. With selection of the proper type and number of hammers, rotor speeds, and internal sizing screen, the granulator 24 produces a raw grind having no more than 10–25 percent of the material finer than USS No. 50, the remainder being granules in the range of −USS No. 4 to +USS No. 50. While hammers can be of various types, and can operate at top speeds of 50 to 100 feet per second, preferred conditions for achieving the desired grind employ the hammers operating at tip speeds of 60 to 75 feet per second. Similarly, while sizing screens can be of various types, the preferred conditions employ screens with a minimum of 60 percent open area, with openings set to pass the largest particle size desired. However, if ribbon temperature is too low, or if the ribbon has been formed at too low a compaction pressure, the amount of fines generated during granulation will increase rapidly, readily exceeding 50 percent of the raw grind.

The granulated sodium cyanide product is fed into the throat of classifier feed venturi 25 where it is pneumatically conveyed to classifier 26 by line 27. Air to convey the granulated, predensified product is supplied to venturi 25 from blower 20 through line 28 and is the same essentially carbon dioxide free air used to convey the moist crystals to the compactor.

The granulated product is classified in classifier 26 in a hot air system so that the product from the classifier contains no more than 20 percent by weight of —USS No. 50 fines and preferably 10–15 percent of such material (This means there is a maximum of 15 percent finer than USS No. 50) and is at an elevated temperature. Part of the granulated, dense product is diverted through line 29 to granular product pack bin 30. The rest of the granulated, predensified product passes through line 31 to briquetter feed bin 32 and then to the rotary briquetting press 33.

To accomplish the desired combination of properties, namely uniform density, durability and controlled solution rate of the briquetted product, the temperature of the predensified, classified granular product is within the range of 125° to 200° C. and the granular product is briquetted at a pressure within the range of 5,000 to 45,000 p.s.i. However, in order to obtain the unique and preferred product qualities, the predensified granular feed stock is briquetted at a temperature within the range of 150° to 175° C. and a pressure within the range of about 8,000 to 15,000 p.s.i. preferably about 10,000 to 13,000 p.s.i. Under these latter conditions, a tough, durable briquette is obtained which is characterized by a high relative density, uniform internal hardness and a high rate of solution. Fracture and crystallographic studies of the internal granular structure indicate that there is a planar surface between granules and the bond between individual granules has become essentially as strong as the cleavage strength of the sodium cyanide crystals themselves. A durable briquette is produced which can be handled in drums, conveyors, etc., etc. without breakage and without dusting.

After briquetting, the briquettes are passes to rotary screen 34, where the "fins," or thin layers of material attached to the periphery of the briquette centerline, are removed and then to briquette pack bin 35.

The fines separated in classified 26, i.e., the material under USS 50-mesh, are recycled to the compactor feed bin 19 through line 36 by blower 37. The fines are deposited in bin 19 by cyclone 38 and the exit air in line 39 is fed blower 40 to a recycle scrubber and condenser 41 through line 42 where the air is cooled to 50° to 60° C. and any hydrogen cyanide and fine sodium cyanide dust that may be present are removed. The air then passes to another scrubber 43 through line 44 where water removed in the drying step and any remaining cyanides are removed. Hot air used to predry the filter cake on filter 10 is also cooled and scrubbed in tower 43 to remove entrained liquor, and it joins line 44 through line 45.

The air returns to blower 11 through line 46 and then to heater 15 through line 47 and, thus, recycles through the process. Totally enclosing and recirculating the air eliminates exposure of the sodium cyanide to carbon dioxide. This closed air loop coupled with adiabatic drying leads to a substantial reduction in the sodium carbonate and sodium formate content of the product, and a minimum sodium cyanide assay of 99 percent is achieved.

The unique physical properties of the sodium cyanide briquettes are more accurately illustrated in FIGS. 2 to 7. Sodium cyanide crystals having a moisture content of under 0.03 percent by weight were predensified at 180° to 190° C. and a compaction pressure of 7,000 to 8,000 p.s.i. in a horizontal roll press. The granular briquetting feed had a size range of 88 percent —USS No. 4 to +USS No. 50 and 12 percent finer than USS No. 50. These granules, having a particulate density of at least 1.55, were then formed into briquettes at various temperatures and pressures.

The briquettes were then subjected to the following tests:

SOLUTION RATE

The solution rate of the cyanide ovaloid briquettes in water is determined by placing approximately 8 ounces of approximately 0.5 ounce briquettes (to the nearest whole briquette) in a 6 inch high × 4.5 inch diameter stainless steel wire basket 3 inch off the bottom of a four-liter beaker containing 1 gallon of water. The basket is constructed of 30-mesh type 316 stainless steel screen with a wire diameter of 0.013 inch. The water temperature for the test is held at 60° C., and care is taken so that no agitation is present. The time required for the last trace of each briquette to disappear is recorded separately. The average of these times for all briquettes is recorded under the heading "Solution Rate."

Crush Strength

The briquette to be tested is placed on its side on the bottom platen of a Carver laboratory press. A 1-inch diameter steel cylinder is then placed between the upper platen and the top side of the briquette. The hydraulic pressure is then slowly increased. The gage pressure is recorded for (1) the appearance of the first visible crack which develops along the large transverse radian of the upper face of the briquette, and for (2) the point where the briquette and collapses. The crush strength is recorded as the pressure at which the first visible crack appears.

Hardness

Hardness tests are carried out at room temperature in a low relative humidity atmosphere (under 35 percent R. H.). To measure internal hardness, the briquettes are cut in half along the major axis in the plane perpendicular to the plane connecting the leading and trailing edges. The exposed cut surface are sanded smooth with an extra-fine grit sandpaper. External hardness is measured on the surface of the whole briquette along the intended line of cut. This outer case of higher hardness is observed to be about one-tenth inch in thickness, although it does vary from point to point over the briquette, and will vary somewhat with varying briquetting pressures. A Shore Durometer, ASTM Designation D2240, type D, is applied to selected reference points along the centerline to determine "hardness." Sufficient pressure is applied to assure firm contact between the reference plate of the Durometer and the surface being measured. Dial readings (0–100) are taken within one second after firm contact is made, and are recorded directly as a measure of relative hardness.

Specific Gravity

To minimize random error, sample size for this test is taken as ten briquettes, selected as typical of the forming conditions imposed. The weight of the 10-briquette sample, in grams, is determined accurately to the first decimal place, i.e., to the nearest five-hundredths gram. The briquettes are transferred to a calibrated container and a known volume of dry white kerosene or other nonsolvent is added. The combined volume of briquettes-plus-liquid is then read to the nearest one-tenth milliliter, and the briquette volume obtained by difference. Briquette specific gravity is then calculated as follows:

$$\text{Specific gravity} = \frac{\text{weight of briquets}}{\text{volume of briquets}}$$

All tests are made at ambient temperature. The accuracy of the determination is well within one-tenth of one percent.

Relative Density

The relative density is for the briquette as a whole and is a calculated figure, being the ratio between measured compacted density (specific gravity) and true crystal density of 1.596. At a relative density of 1.00, compacted density would be the same as true crystal density.

Figure 2:
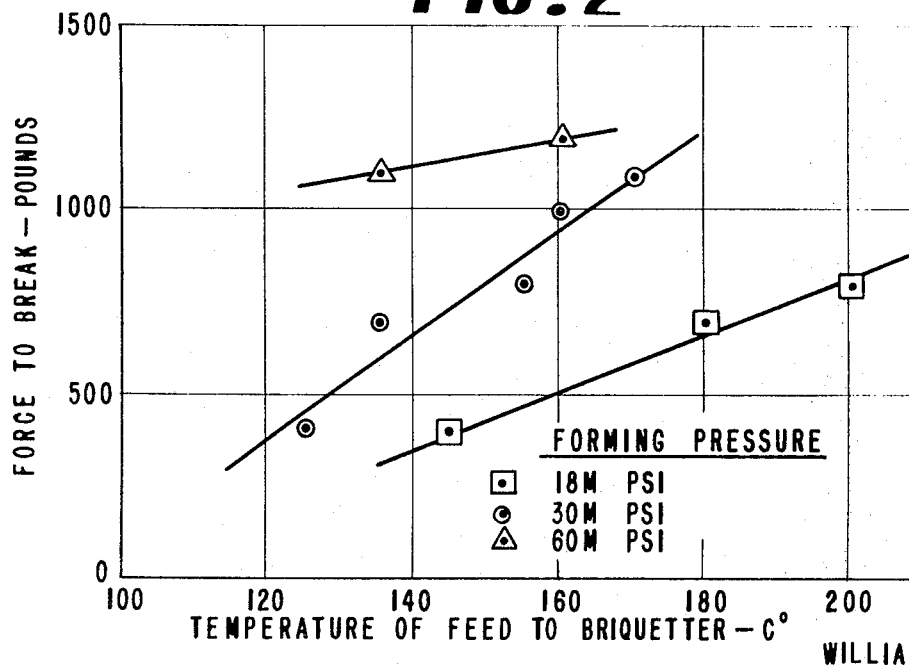
FIG. 2 is a graph showing briquette durability as a function of granular feed temperature at various pressures.

The results of the above-mentioned tests are shown in FIGS. 2 to 7. FIG. 2 shows the effect of temperature of the feed and forming pressure on sodium cyanide briquette durability in terms of compressive force required to break or crush the briquette. While the general trend was anticipated, the apparent convergence of the 30,000 p.s.i. and the 60,000 force lines at higher temperatures was unexpected.

Figure 3:
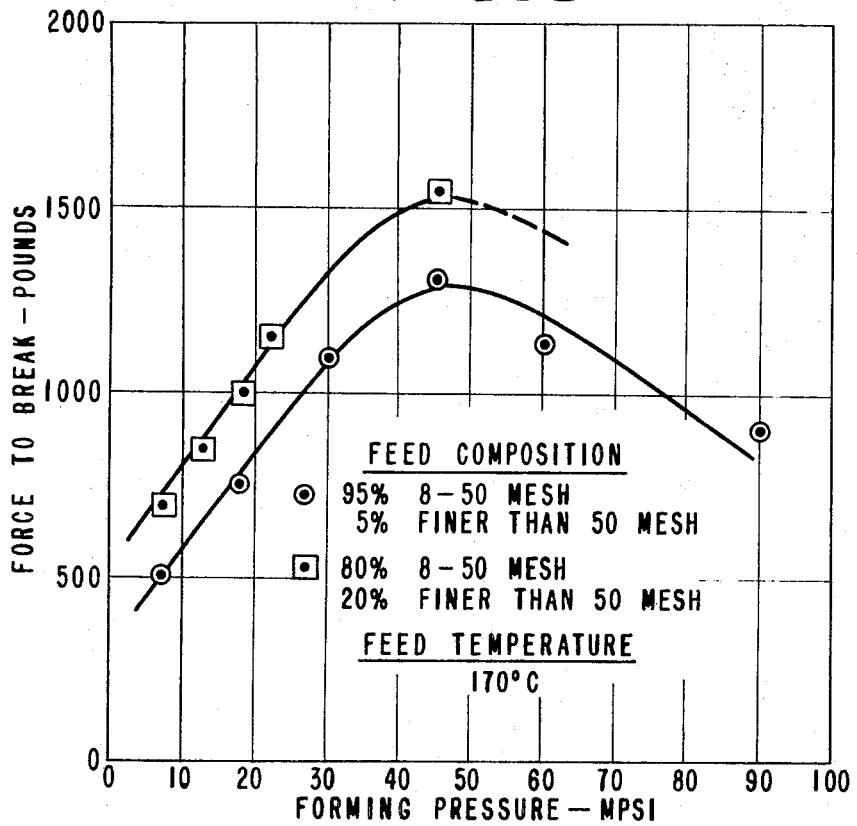
FIG. 3 is a graph showing briquette durability as a function of forming pressure at a granular feed temperature of 170° C.

The results of further investigation are shown in FIG. 3. This figure clearly shows the performance peak suggested in FIG. 2. The decline in durability at pressures above 45,000 p.s.i. is indicated by fracture studies to be the result of generation of internal stress planes which act as points of incipient cleavage. This is supported by the results shown in FIGS. 5 and 6, which show that compacted unit densities of 1.594 are obtained at 30,000 p.s.i. forming pressures at a feed temperature of 170° C., compared to the specific crystal density of 1.596. This corresponds to a relative density of 0.998 as shown on FIG. 6. At pressures higher than 45,000 p.s.i., and with having reached the relative density of 1.00, the excess pressure is expended in frictional losses and the generation of internal stresses. A relative density of at least 0.97 is a critical value based on a careful determination of briquette density. This corresponds to a briquette specific gravity of about 1.55. At a relative density of about (Sp. gr. of 1.53) the briquettes are substantially less durable, and even though they have a faster solution rate, they are much less satisfactory for handling due to attendant breakage and dusting.

Figure 4A:
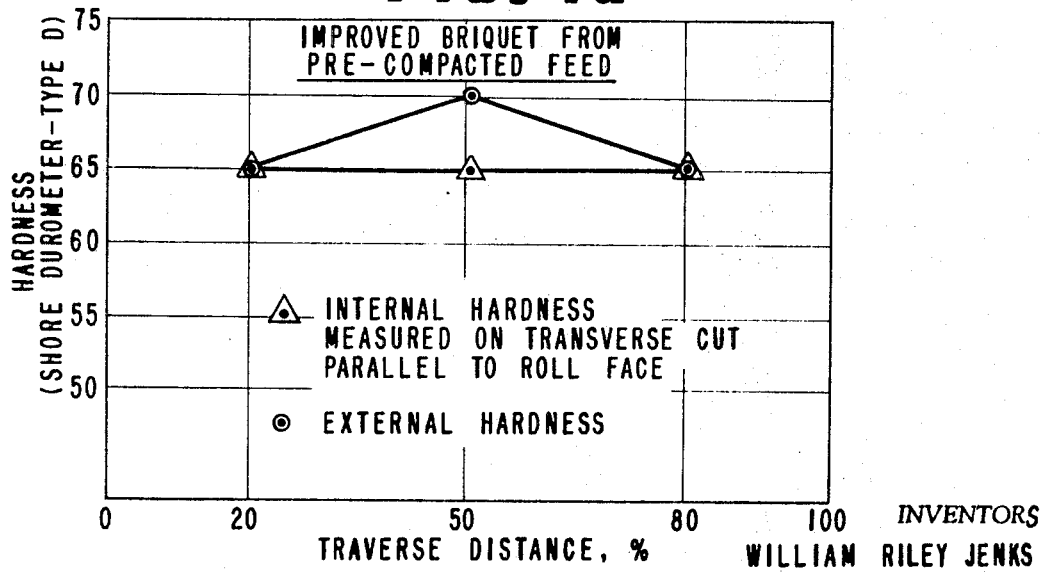
Figure 6:
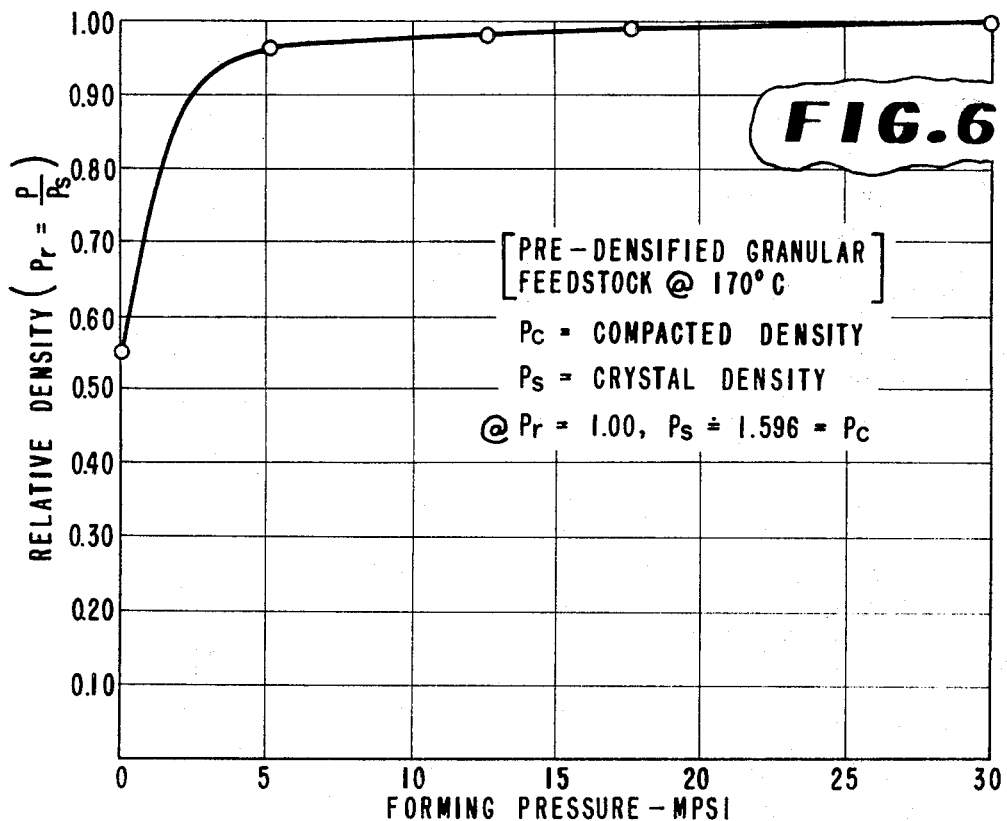
FIG. 6 is a graph showing the relation of briquette density to crystal density as a function of forming pressure at a granular feed temperature of 170° C; and, FIG. 7 is a graph showing briquette solution time as a function of forming pressure at a granular feed temperature of 170° C.

Briquettes made at pressures up to 45,000 p.s.i., from precompacted or predensified feedstocks exhibit a marked increase in internal uniformity as shown by the comparison of the graphs in FIGS. 4a and 4b.

Figure 7:
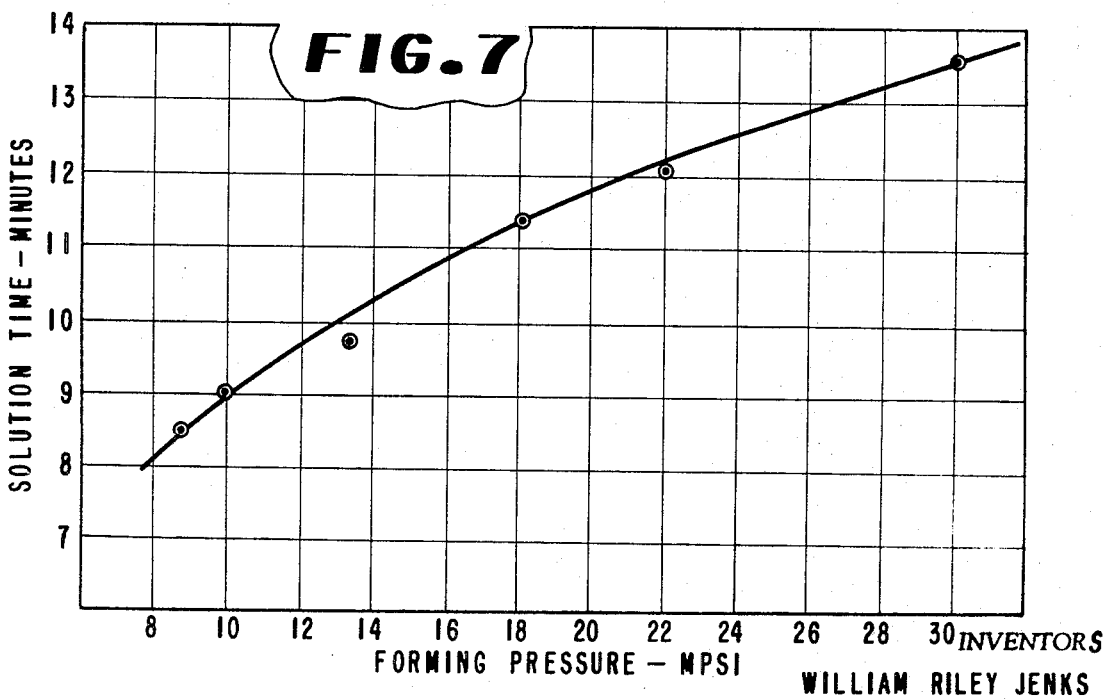

Since rate of solution of briquetted sodium cyanide is of importance in many end uses, the effect of forming pressures at 170° C. on this property is shown in FIG. 7. This figure indicates that to obtain a solution rate of 8–11 minutes, a forming pressure of about 8,000 to 15,000 is used. A solution rate of 9–10 minutes is preferred with a corresponding forming pressure of about 10,000 to 13,000 p.s.i.

The briquettes produced under the preferred conditions set forth herein possess a smooth, continuous surface of marked uniformity and with no porosity visible even under 4X to 8X magnification. Density of such briquettes can be determined directly, as described above, without further preparation. Briquettes produced under conditions outside those disclosed, as for example at lower forming pressure and/or at lower feedstock temperatures, will frequently possess porosity apparent even to the unaided eye. Such briquettes must be sealed with a thin coating or film of clear lacquer or other impervious material and allowed to dry completely before the specific density test is carried out. If not so treated, liquid will penetrate into the briquette and the determinations will be erroneous.

It should be recognized that potassium cyanide granules and briquettes can also be manufactured by the process of the present invention. Although commercially less important than sodium cyanide, the potassium cyanide market requirements can be satisfied by occasionally running the process with potassium cyanide crystals.

We claim:

1. A process comprising: compacting sodium cyanide crystals having a moisture content of no more than 0.05 percent by weight under a pressure within the range of 5,000 to 15,000 p.s.i. and a temperature within the range of 125° to 225° C. into a translucent, noncrystalline sheet of ribbon of sodium cyanide; breaking the sodium cyanide sheet or ribbon into granules having a maximum size of USS No. 4 and having no more than 10–25 percent of the granules finer than USS No. 50; classifying the granules as required so that the granular product has no more than 20 percent of USS No. 50 fines and recycling the remaining fines from the classifying step to the compacting step 2. The process of claim 1 wherein the compacting pressure is within the range of 6,000 to 10,000 p.s.i. and the compacting temperature is within the range of 180° to 225° C.

3. The process of claim 1 wherein the compacted sheet has a density within the range of 1.550 to 1.590.

4. The process of claim 1 wherein the compacted sheet has a thickness between about one-eighth t0 three-sixteenths inch.

5. The process of claim 1 wherein the classified granules are formed into briquettes at a pressure within the range of 5,000 to 45,000 p.s.i. and a temperature within the range of 125° to 200°C.

6. The process of claim 1 wherein the classified granules are formed into briquettes at a pressure within the range of 8,000 to 15,000 p.s.i. and a temperature within the range of 150° to 175 —°C.

7. A process comprising: compacting sodium cyanide crystals having a moisture content of no more than 0.03 percent by weight at a pressure within the range of 5,000 to 15,000 p.s.i. and a temperature within the range of 125° to 225° C. into a translucent, noncrystalline sheet or ribbon of sodium cyanide having density within the range of 1.550 to 1.590; breaking the sodium cyanide sheet or ribbon into granules having a maximum size of USS No. 4 and having no more than 10–25 percent of the granules finer than USS No. 50; classifying the granules as required so that the granular product has no more than 15 percent of USS No. 50 fines; recycling the remaining fines from the classifying step to the compacting step and forming the granules into briquettes at a pressure within the range of 8,000 to 15,000 p.s.i. and a temperature within the range of 150° to 175°C.

8. A process of preparing sodium cyanide briquettes from a solution of sodium cyanide containing crystalline sodium cyanide comprising: filtering crystalline sodium cyanide; subdividing and pneumatically conveying and simultaneously drying adiabatically the filtered crystalline sodium cyanide in an essentially carbon dioxide free hot airstream to a moisture content of not more than 0.05 percent by weight; compacting the dried sodium cyanide crystals into a translucent, noncrystalline sheet or ribbon of sodium cyanide; breaking the sheet or ribbon into granules having a density within the range of 1.550 to 1.590 and having a maximum size of USS No. 4 and having no more than 10–25 percent of the granules finer than USS No. 50; pneumatically conveying and classifying the granules as required to a granular product having no more than 20 percent of USS No. 50 fines; recycling the remaining fines to the compacting step and forming the high-density granules into briquettes at a pressure within the range of 5,000 to 45,000 p.s.i. and a temperature within the range of 125° to 200°C.

9. The process of claim 8 wherein the filtered sodium cyanide is predried with essentially carbon dioxide free air having a temperature within the range of 250° to 450°C.

10. The process of claim 9 wherein the temperature of the conveying and drying hot airstream is within the range of 275° to 400°C.

11. A sodium cyanide briquette consisting essentially of an internal portion of granules having a planar surface between granules exhibiting a bond essentially as strong as the cleavage strength of a sodium cyanide crystal and an essentially uniform type D Shore hardness of at least 65 throughout and an external compacted portion of higher hardness, said briquette having a relative density of at least about 0.97 and a solution rate equivalent of about 8–11 minutes standard solution time as determined by placing approximately 8 ounces of approximately 0.5 ounce briquettes in a 30-mesh stainless steel wire basket 6 inches high by 4.5 inches in diameter and having a wire diameter of 0.013 inch, placing the basket 3 inches off the bottom of a four-liter beaker containing 1 gallon of nonagitated water at a temperature of 60°C. and measuring the average time required for the last trace of each briquette to disappear.

12. The sodium cyanide briquette of claim 11 wherein the external compacted portion is about one-tenth inch in thickness and has a type D Shore hardness of about 70.

13. The sodium cyanide briquette of claim 12 wherein the solution rate equivalent is about 9–10 minutes standard solution time.